(12) United States Patent
Truglia

(10) Patent No.: US 9,677,400 B2
(45) Date of Patent: Jun. 13, 2017

(54) HIGH-EFFICIENCY ENGINE DRIVEN BY PRESSURIZED AIR OR OTHER COMPRESSIBLE GASES

(75) Inventor: Vito Gianfranco Truglia, Cremona (IT)

(73) Assignee: AIR POWER TECHNOLOGIES GROUP LIMITED, Derby (GB)

( * ) Notice: Subject to any disclaimer, the term of this patent is extended or adjusted under 35 U.S.C. 154(b) by 1134 days.

(21) Appl. No.: 13/580,930

(22) PCT Filed: Feb. 22, 2011

(86) PCT No.: PCT/IB2011/000347
§ 371 (c)(1),
(2), (4) Date: Aug. 23, 2012

(87) PCT Pub. No.: WO2011/104606
PCT Pub. Date: Sep. 1, 2011

(65) Prior Publication Data
US 2012/0318133 A1    Dec. 20, 2012

(30) Foreign Application Priority Data
Feb. 24, 2010  (IT) .............................. MI2010A0299

(51) Int. Cl.
| F01B 29/10 | (2006.01) |
| F01B 17/02 | (2006.01) |
| B60K 3/02 | (2006.01) |
| B60K 3/04 | (2006.01) |
| F01D 1/02 | (2006.01) |

(52) U.S. Cl.
CPC .............. *F01B 17/02* (2013.01); *B60K 3/02* (2013.01); *B60K 3/04* (2013.01); *F01D 1/026* (2013.01); *Y02T 50/671* (2013.01)

(58) Field of Classification Search
CPC .... B60K 3/00; B60K 3/02; B60K 3/04; F01B 13/02; F01B 17/02; F01D 1/026; Y02T 50/671
USPC ...................... 60/370, 407, 411, 412; 91/441
See application file for complete search history.

(56) References Cited

U.S. PATENT DOCUMENTS

| 3,765,180 | A | 10/1973 | Brown |
| 6,419,467 | B1* | 7/2002 | Murase ................. F04B 39/104 137/855 |
| 6,508,324 | B1 | 1/2003 | Conley, Jr. |
| 8,499,553 | B2* | 8/2013 | Cai ......................... F01B 17/02 60/370 |

(Continued)

FOREIGN PATENT DOCUMENTS

| CN | 101135246 A | 3/2008 |
| CN | 201 339 489 Y | 11/2009 |

(Continued)

OTHER PUBLICATIONS

International Search Report Aug. 10, 2012.

*Primary Examiner* — Logan Kraft
(74) *Attorney, Agent, or Firm* — Hedman & Costigan, P.C.; James V. Costigan; Kathleen A. Costigan

(57) ABSTRACT

A negative-emission pressurized air or other compressible gas operated high-efficiency reciprocating or rotary piston engine, as autonomously considered or as part of a complex system, comprises at least a tank, at least a turbo-alternator and one or more optional fluid heaters.

17 Claims, 17 Drawing Sheets

(56) References Cited

U.S. PATENT DOCUMENTS

2009/0044778 A1* 2/2009 Scuderi .................. F01L 1/181
                                                                                  123/188.2
2009/0183504 A1    7/2009 Shofner, II

FOREIGN PATENT DOCUMENTS

| CN | 101598035 A | * 12/2009 | ............ F01B 17/02 |
|----|-------------|-----------|------------------------|
| DE | 3546373 A1  | 7/1987    |                        |
| GB | 1362445 A   | 8/1974    |                        |
| GB | 2018366 A   | 10/1979   |                        |
| WO | 2007128195 A1 | 11/2007 |                        |

\* cited by examiner

HIGH-EFFICIENCY ENGINE DRIVEN BY PRESSURIZED AIR OR OTHER COMPRESSIBLE GASES

BACKGROUND OF THE INVENTION

The present invention relates to a high-efficiency engine, either of a reciprocating or rotary piston type, driven by pressurized air or other compressible gases, with negative emissions, both as individually considered as a part of a complex system.

A very important problem both with respect to climatic and human health issues, is that to provide engines with high operating efficiencies and non-polluting emissions.

Since an engine or propelling device should be always considered as an energetic application and not an energetic vector, it would be very desirable to is provide such an engine having an energy efficiency as high as possible, thereby saving natural or industrial resources, and preventing polluting emissions from being generated, also considering the fact that polluting motor vehicles and static driving apparatus are mainly concentrated in towns and like environments.

At present, no concrete solution to the above problems exists, with the exception of a use of hybrid vehicles, that is either driven by mixed electric power and hydrocarbon fuel systems or by electrical battery based systems only, which vehicles, however, have both a small power efficiency and highly noxious emissions and an additional problem of properly disposing of highly polluting exhausted batteries.

SUMMARY OF THE INVENTION

Accordingly, the aim of the present invention is to provide a novel negative-emission piston driving device or engine, driven by pressurized air or other compressible gas, having a power efficiency much larger than that of conventional air-operated pneumatic cylinder devices, in addition to a small propellant consume.

Within the scope of the above mentioned aim, a main object of the invention is to provide such a negative-emission pressurized air or other compressible gas driven piston engine having a performance similar to that of an internal combustion engine while operating based on a specifically designed propelling or driving operating cycle allowing to filter and clean, in particular conditions, outside air.

Another object of the present invention is to provide such a high-efficiency air-propelled non-polluting piston engine with a negative emission performance.

Another object of the invention is to provide such a high-efficiency air-propelled non-polluting piston engine, which is adapted to operate in a "negative-emission mode of operation", that is to suck environment air and, after having used said air, to discharge it in a clean and filtered condition.

Yet another object of the present invention is to provide such a flexibly operating air-propelled piston engine to be used in a very broad range of commercial and private traction motor vehicles, boats, airplanes, and other either static or not industrial and private driving applications.

Another object of the present invention is to provide such a high-efficiency engine which, owing to its specifically designed construction, is very reliable and safe in operation.

According to one aspect of the present invention, the above mentioned aim and objects, as well as yet other objects, which will become more apparent hereinafter, are achieved by a pressurized air or other compressible gas driven high-efficiency engine, said engine comprising at least a cylinder and at least a piston movable in said cylinder, an engine head plenum forming pre-chamber having a size proportional to a displacement of said engine and to a power to be achieved thereby: said pre-chamber being continuously supplied by pressured air or other compressible gas from a pressurized air or compressible gas outer tank, at a variable pressure being achieved by at least two adjustments; said engine being moreover characterized in that it comprises unidirectional valves, applied to one or more suction ducts formed in said head, thereby allowing said piston, during its mechanical work performing downward stroke to suck, by a negative pressure, outside air to convey it to said expansion chamber. Said valves operating to overcome the cylinder vacuum resistance in a passive working mode of operation.

Specifically designed filters are moreover arranged in said engine head suction ducts, to filter outside air sucked by said piston during its downward movement, which air upon sucking and filtering, and after having performed its mechanical work, being discharged into the environment, in the piston upward movement, through the outlet valves and ducts.

BRIEF DESCRIPTION OF THE DRAWINGS

Further characteristics and advantages of the present invention will become more apparent from the following detailed disclosure of a preferred, though not exclusive, embodiment of the invention, which is illustrated, by way of an indicative but not limitative example, in the accompanying drawings, where.

DESCRIPTION OF THE PREFERRED EMBODIMENTS

Figure 1:
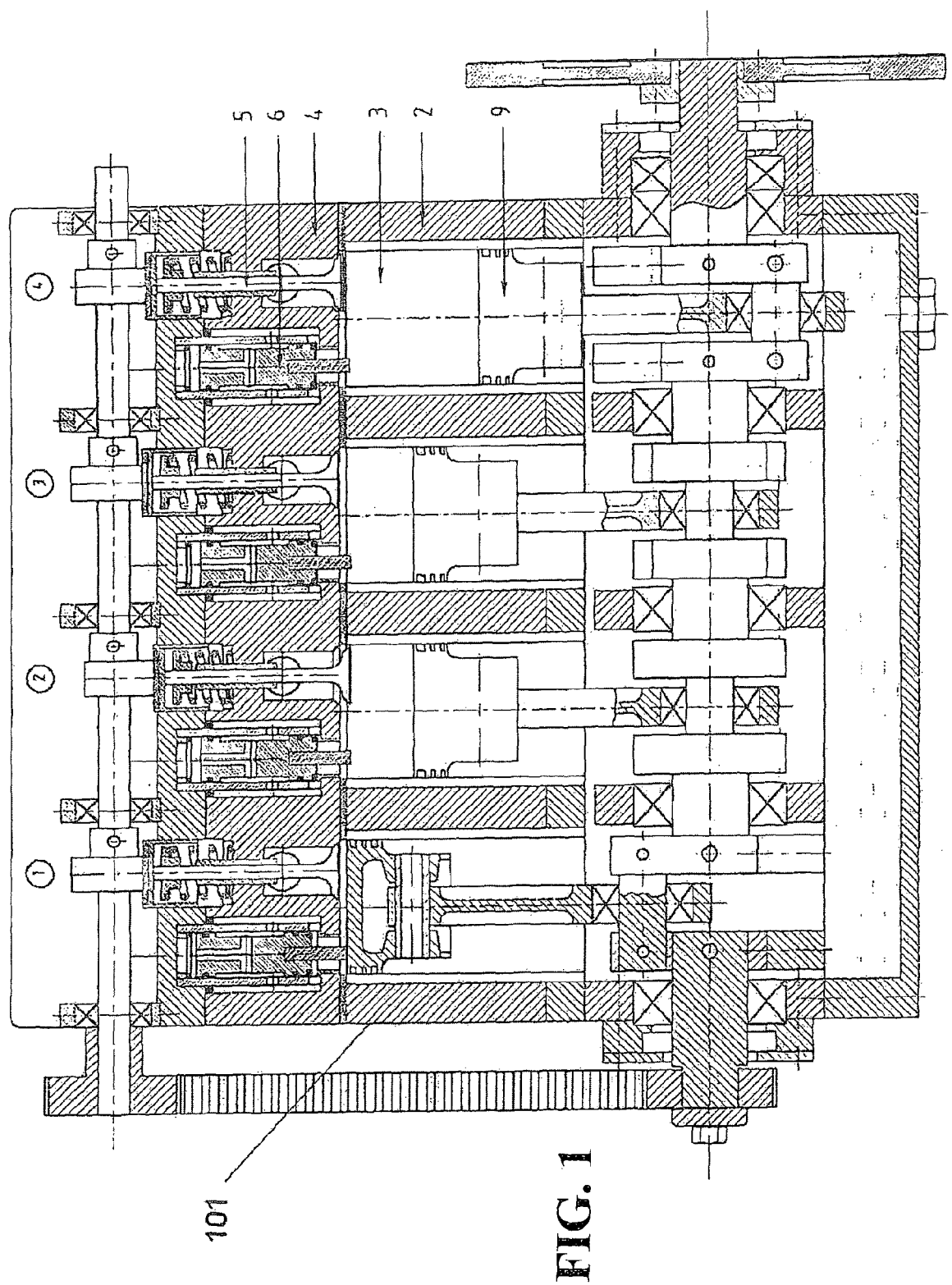
FIG. 1 is a side cross-sectioned view of a prototype of a piston engine, being driven by pressurized air or other compressible gas.
Figure 2:
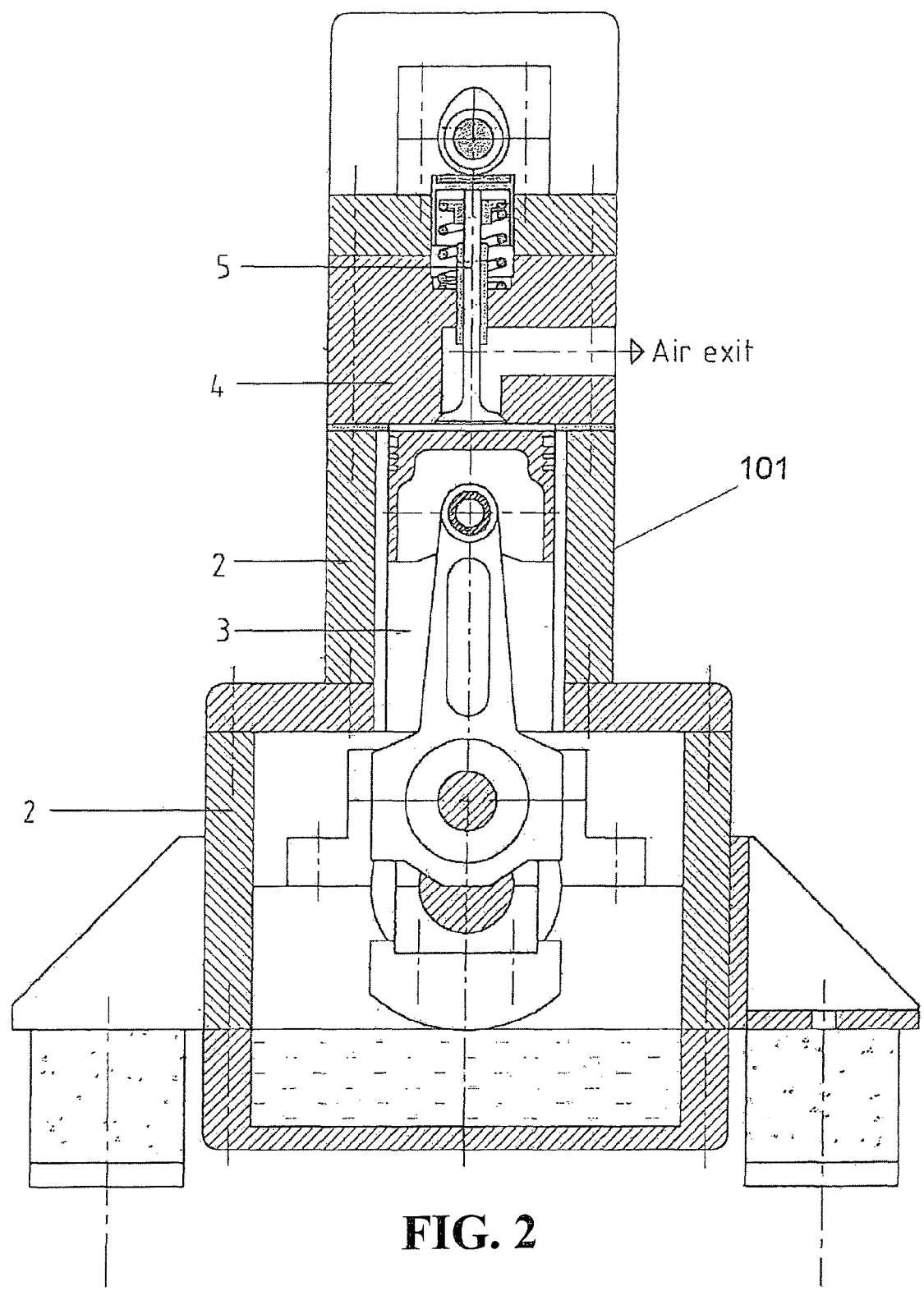
FIG. 2 is a front view, as partially enlarged with respect to FIG. 1, of the inventive engine, showing an outlet valve thereof.
Figure 3:
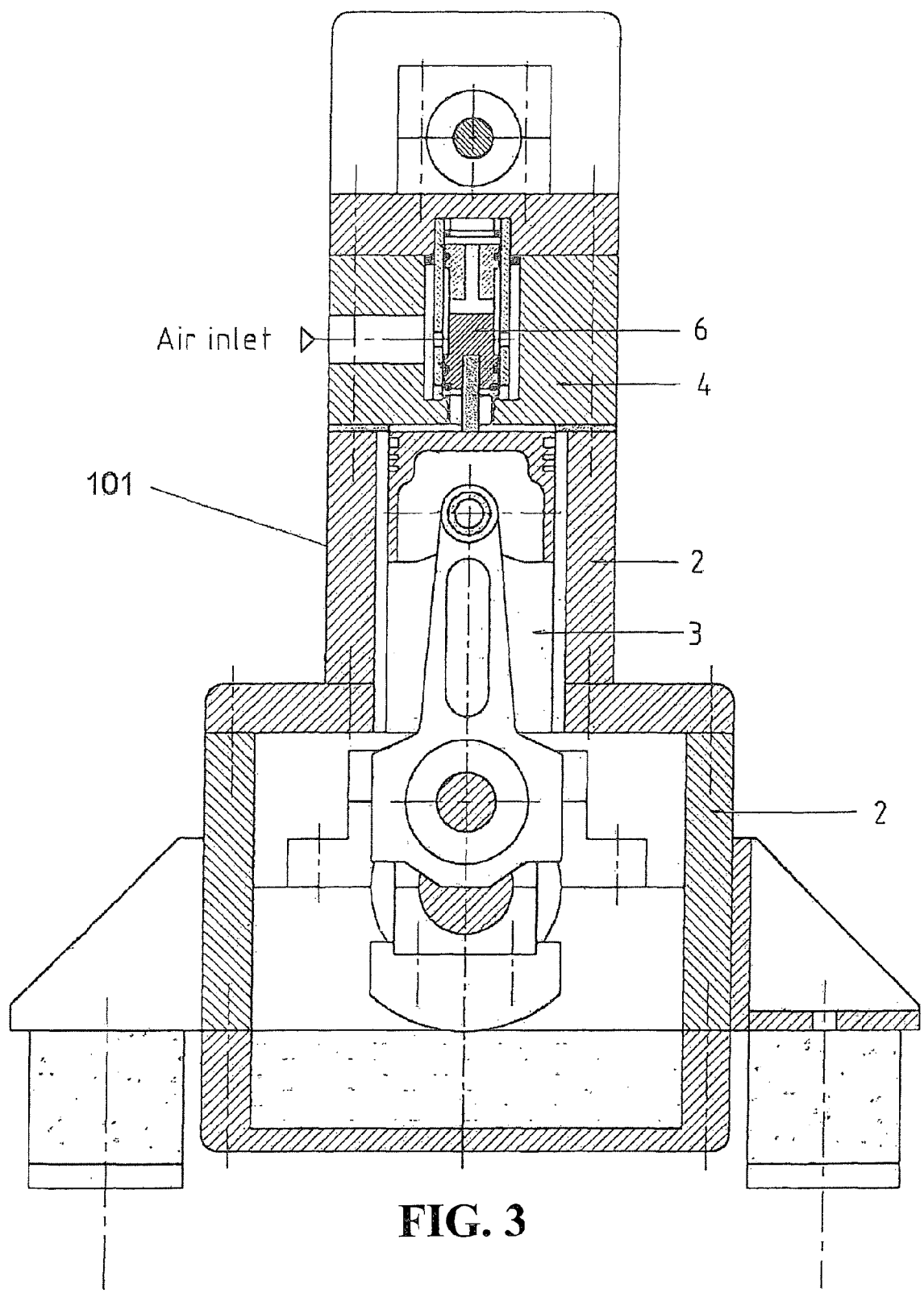
FIG. 3 is a further front view, as partially cross-sectioned and on a scale enlarged with respect to that of FIG. 1, of the inventive engine, and specifically showing an injection or inlet valve thereof.
Figure 4:
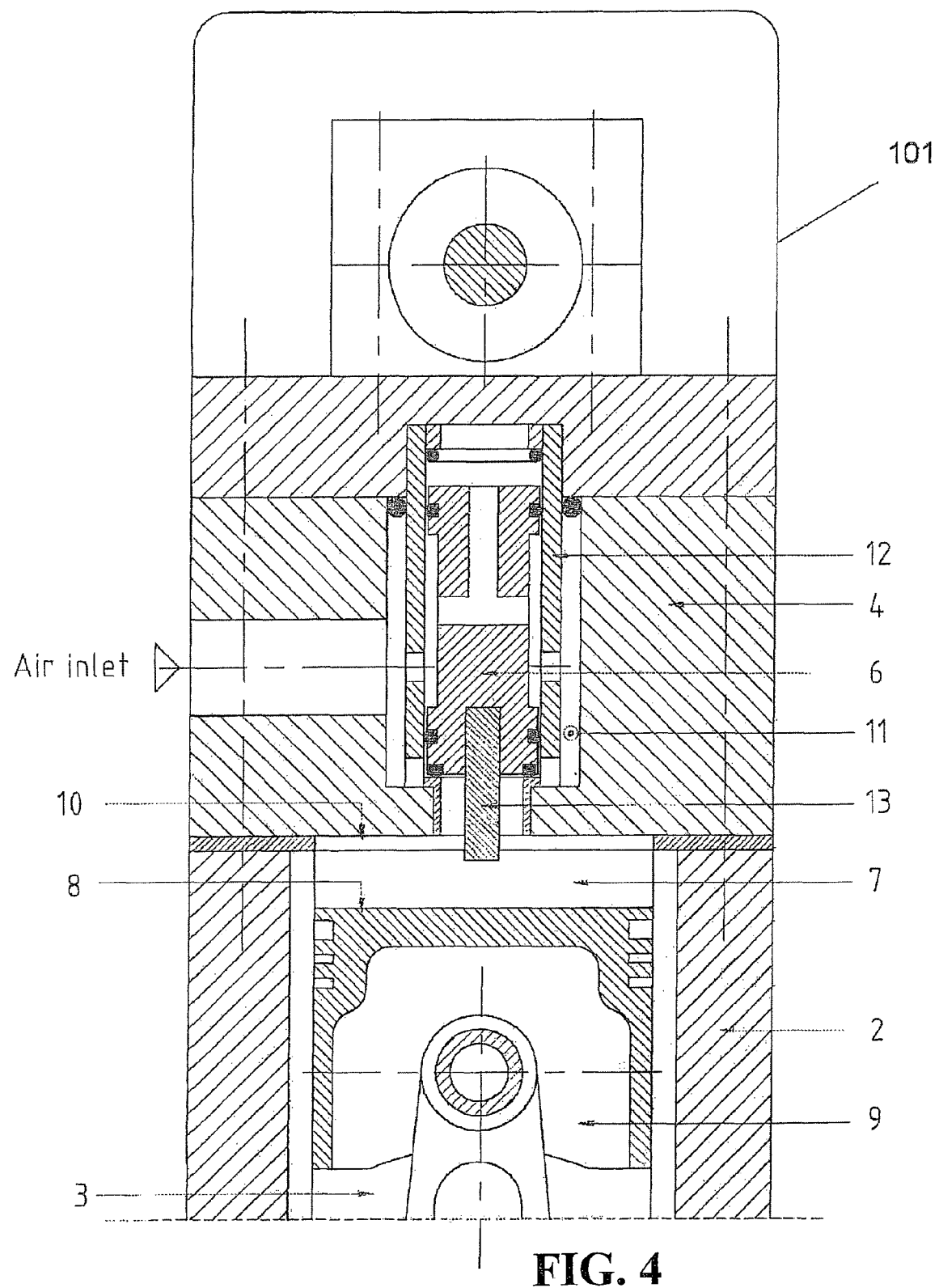
FIGS. 4, 5, 6 and 7 are further front partially cross-sectioned and enlarged front views of the injection valve which is shown in operation.
Figure 5:
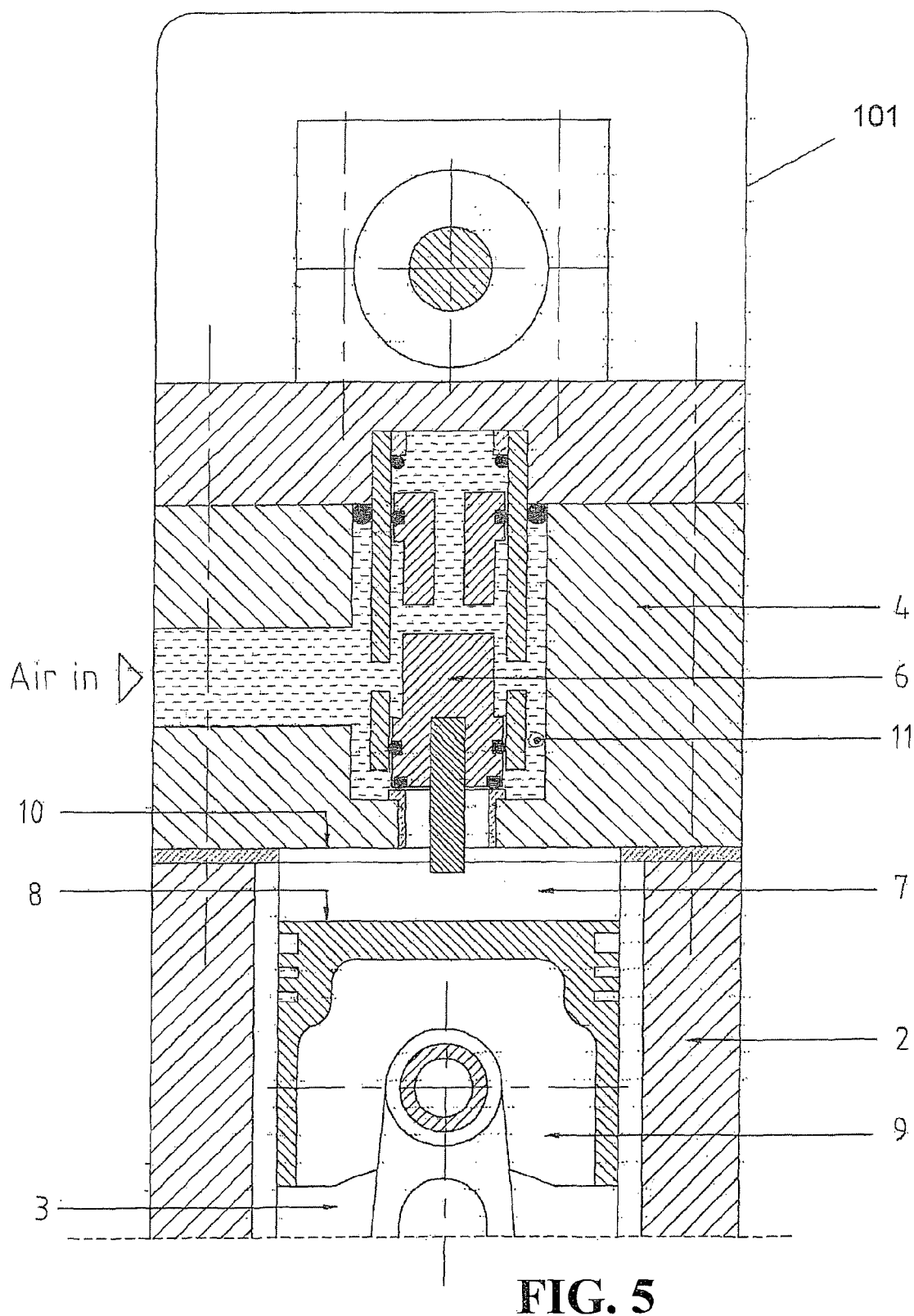
Figure 6:
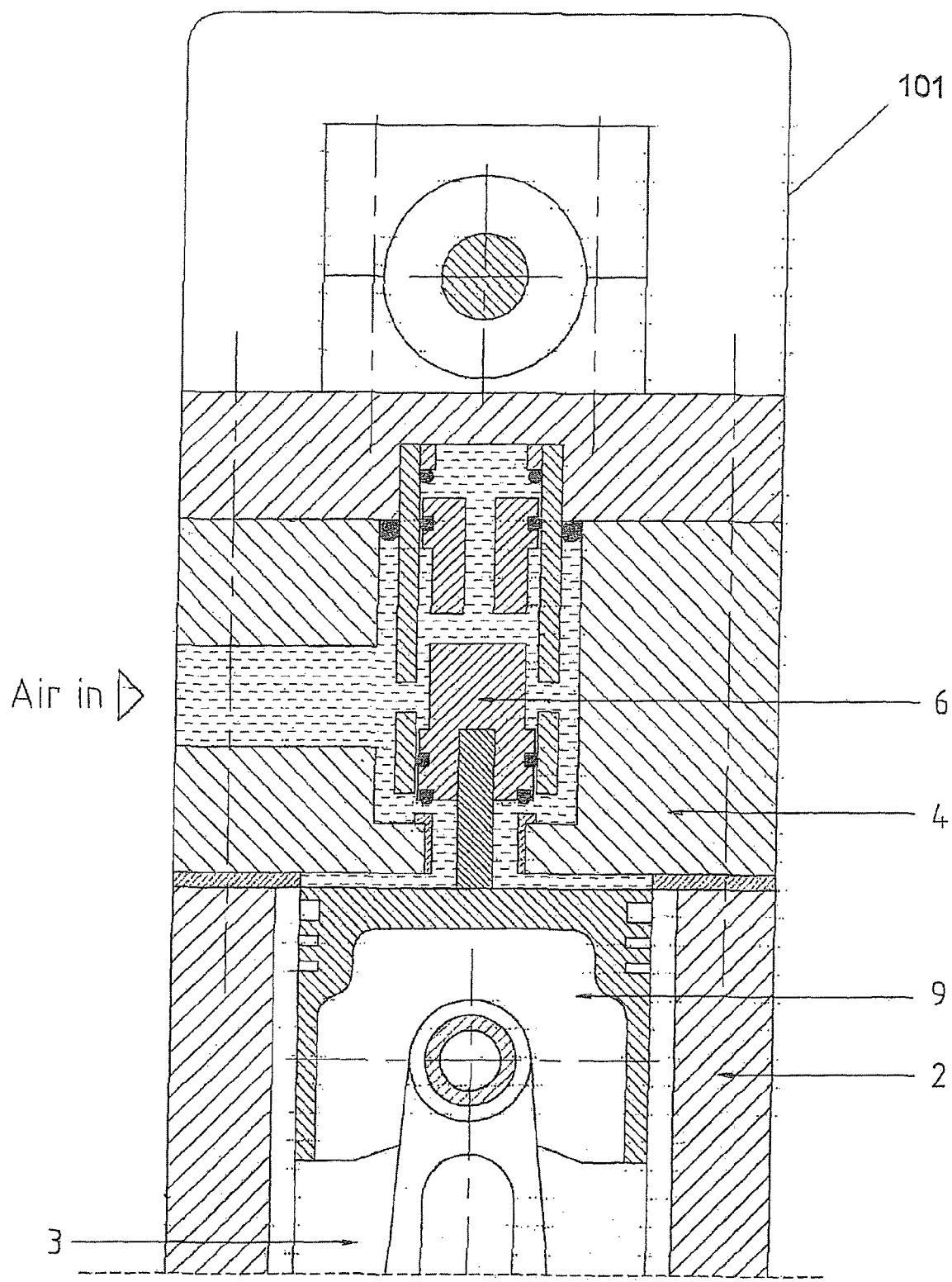
Figure 7:
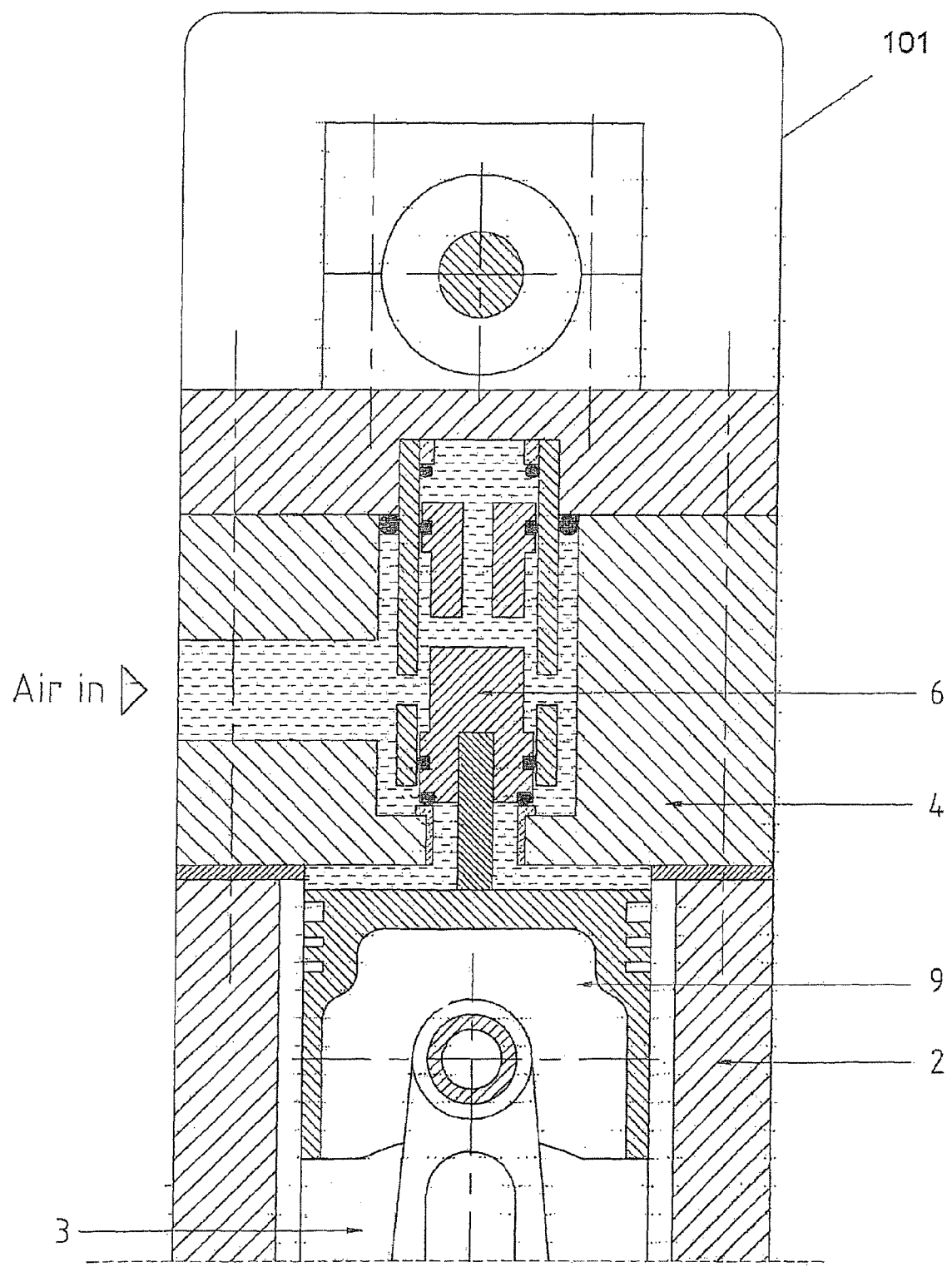
Figure 8:
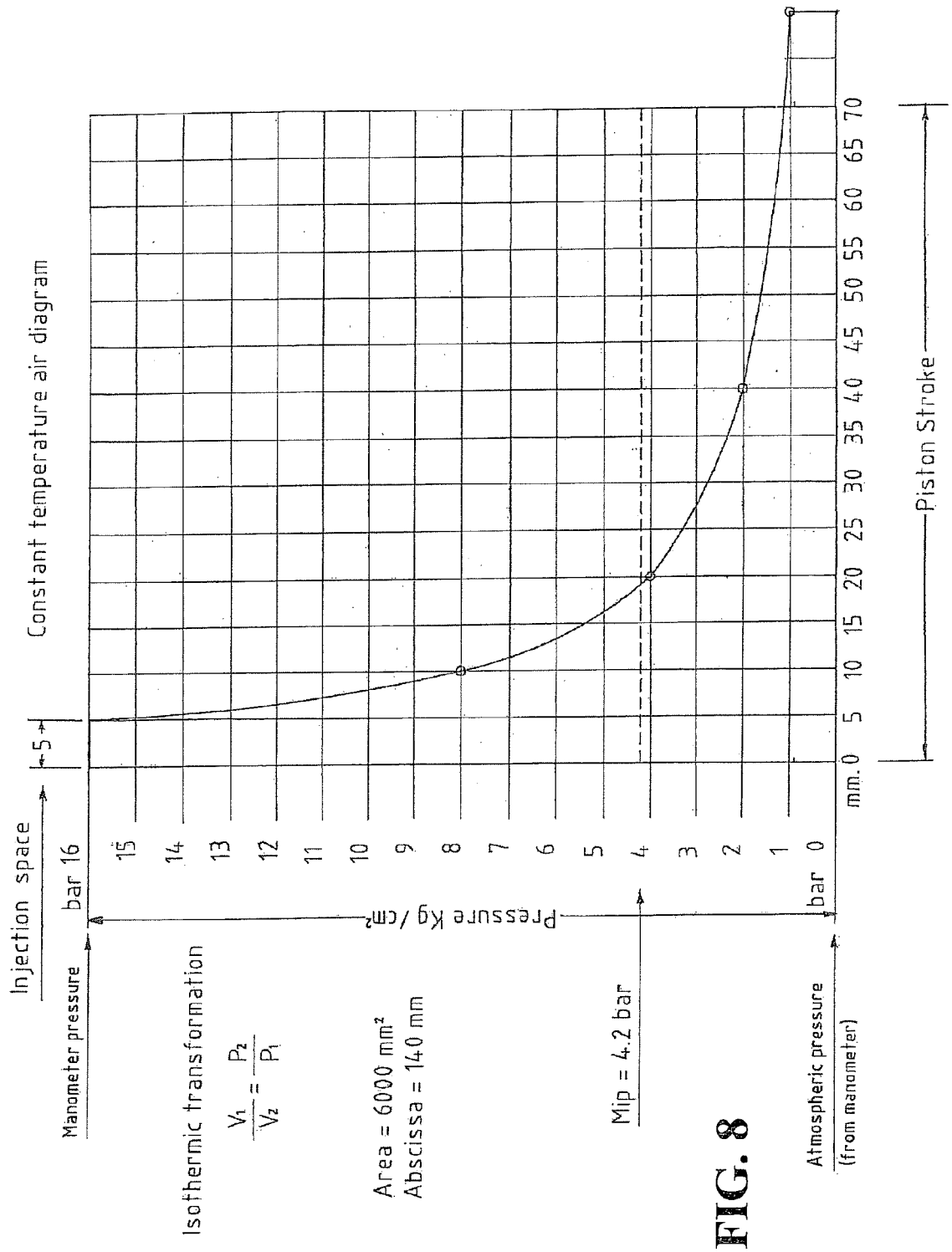
FIG. 8 is a diagram showing as the pressure changes during the piston stroke.

With reference to the number references of the above mentioned figures, a negative-emission high-efficiency piston engine, which has been generally indicated by the reference number 101, comprises, as main components thereof, an engine block 2 to which one or more cylinders 3, each including a cylinder head 4, are associated.

The head 4 of each said cylinder comprises at least an outlet valve 5 and at least an injection or inlet valve 6, which may be communicated with a space 7 defined between the top surface of the piston or plunger 9, and the bottom surface 10 of the head 4.

Said head 4 comprises moreover at least a suction duct 102-103, at least a unidirectional or one-way valve 112-113 and at least a filter 114-115. Said ducts are arranged in said head to allow air to be fed from the outside environment into the cylinder but, owing to the provision of unidirectional or one-way valve, not vice-versa during the piston downward stroke, said air being sucked by a piston negative pressure in the piston downward movement driven by pressurized air in the pre-chamber and coming from the air tank at the start of the piston expanding stroke, upon starting air injection on the piston crown.

With reference to FIGS. 4, 5, 6 and 7, the piston engine according to the present invention operates as follows:

pressurized air is injected at a given pressure (X) into the space between the head portion above the cylinder and piston.

Such a pressurized air injection is performed, in this non-exclusive embodiment of the invention, in an automatic manner owing to the piston head movement which, during the exhausting stroke, before arriving at the top dead center (TDC) opens by pressing the injection valve, thereby communicating the head chamber (having a variable pressure X depending on the required power) and the cylinder, with the piston head arriving at said top dead center.

As the injection valve is raised from the piston, it allows pressurized air or other compressible gas to pass, with a high speed, from the pre-chamber to the piston crown delimiting the expanding chamber.

More specifically, at the start of the expanding stroke or step, the injection valve will be still arranged in an open position thereof, to be finally closed as the piston head is driven, during its downward stroke, for a stroke variable space after the TDC, designed, depending on the inventive engine mode of operation, (and in this non-limiting embodiment depending on the valve stem length), in the example herein shown.

Figure 14:
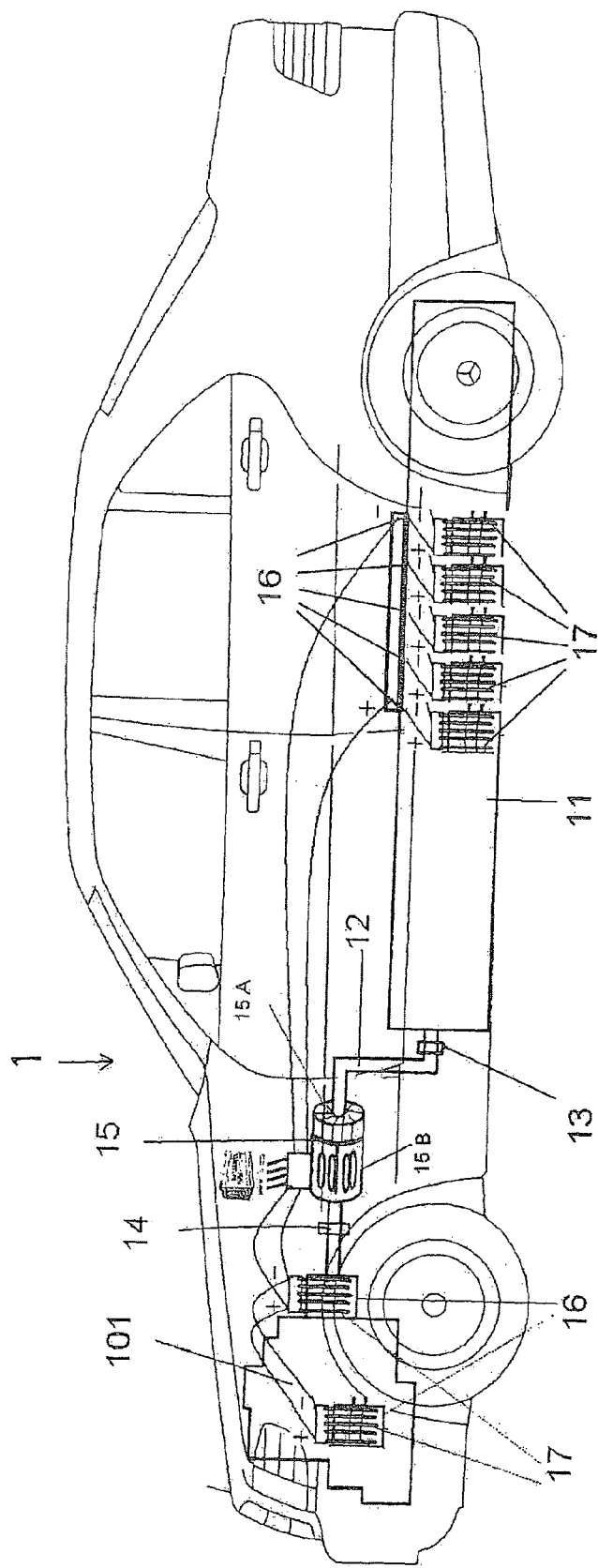
FIG. 14 shows a partially cross-sectioned side view of a motor vehicle thereon the pressurized air or other compressible gas rotary engine constituting an integrating part of the present invention is mounted.

A high-pressure tank 11 supplies pressurized air to the piston engine 101 through a supply circuit 12 comprising a pressure reducing unit 13, the engine pressurized air supplying system having a variable pressure, for example from 20 to 40 bars, depending on the engine displacement and maximum power to be provided thereby (FIG. 14).

Through a solenoid valve 14 said pressurized air tank continuously supplies, through suitable adjustment means, the optional cylinder head pre-chamber.

Alternately, air may be fed to the cylinder by an air direct injection system.

In this non-exclusive embodiment of the invention, first adjusting means control the engine idle mode of operation, and second adjusting means provide a variable adjustment, by-passing the first adjusting means, to control the engine acceleration.

Figure 15:
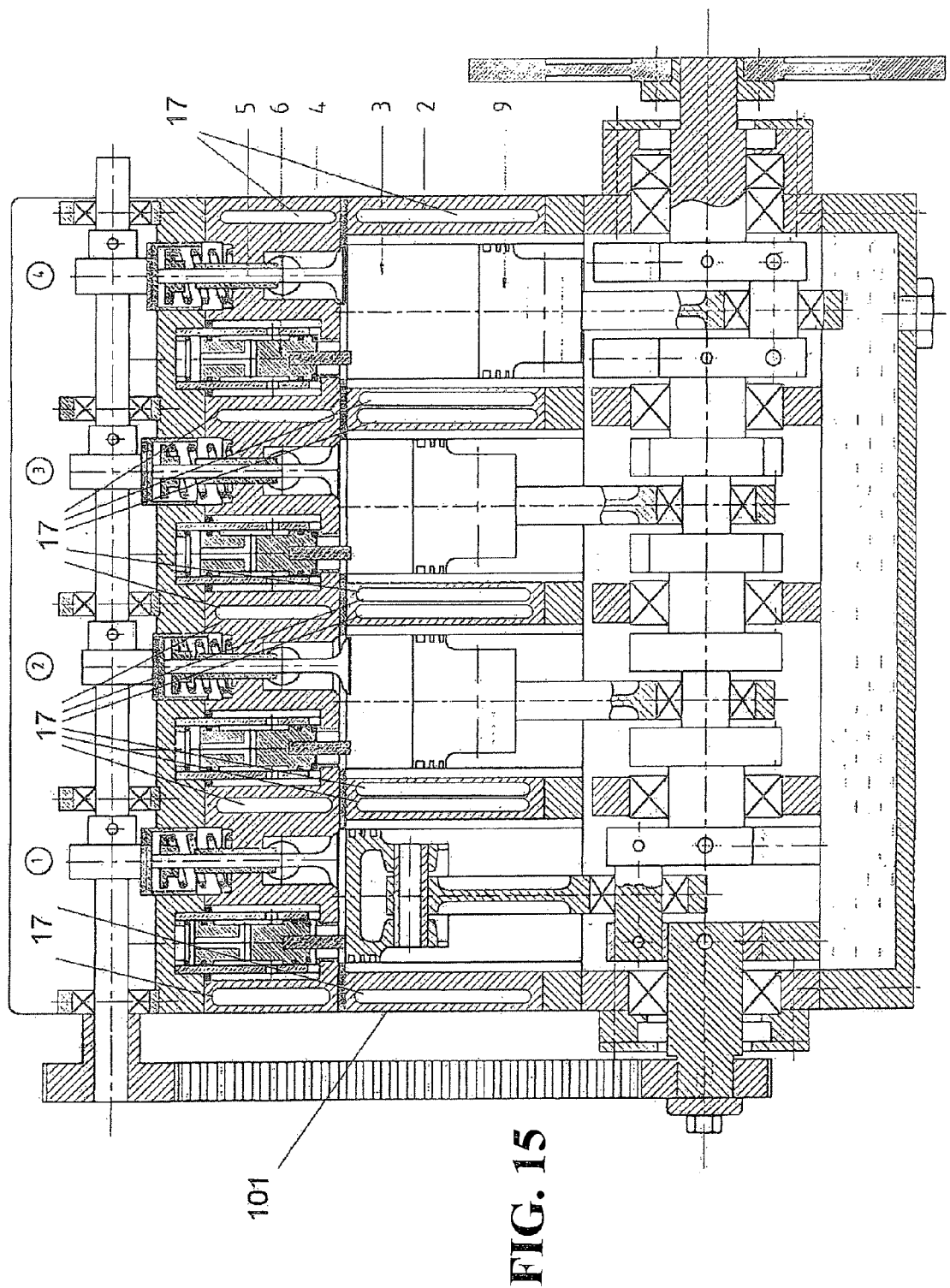
FIG. 15 is a further cross-sectioned side view of the inventive piston engine.

Between the high pressure tank and engine a turbo-alternator 15 (FIG. 14) may be either longitudinally or transversely located (or in any other position) with respect to the fluid flow and/or circuit thereby providing a very efficient operation, said turbo-alternator including, on a front portion thereof, an air tight turbine 15.A, having a turbine shaft coupled to, or constituting, a shaft of an alternator 15.B arranged on the rear of the vehicle, to generate electric power, said turbo-alternator generating electric power from highly pressurized air impinging on the turbine blades (which may have a geometry variable depending on the pressure flow) and fed from the air tank to the engine, said power being used for example for operating optional electric devices and fluid conditioning devices, for heating expanding air through the overall air circuit from the tank to the engine, through heaters 16 and/or resistances 17 (FIG. 14) and, moreover, for heating the engine cylinder/cylinders and/or the engine head (FIG. 15) and/or for loading further optional air tanks for supplying air to said engine head pre-chamber, to reduce and/or eliminate, depending on the generated temperature, any air energy losses caused as said air is cooled in its expansion.

The engine shown in FIGS. 1 to 7 and 10 to 13, which is generally indicated by the reference number 101, is substantially similar to the above disclosed engine.

A further non-exclusive embodiment of the present invention will be now disclosed with reference to FIG. 16 hereinafter.

According to the present invention, said engine head 104 may comprise negative pressure suction ducts, respectively indicated by the reference numbers 102 and 103, allowing the piston 9 to suck, during its downward movement, through the unidirectional valves 112 and 113 allowing air to pass from the outside to the inside environment but non vice-versa, air from the outside environment, to convey said air to said cylinder where the piston surface delimits the expansion chamber 7, thereby overcoming any passive resistances from the cylinder vacuum generated in the passive working step.

In said ducts 102 and 103 filters 114 and 115 for filtering air conveyed through said ducts, which, after use in the engine operating cycle, is again discharged into the environment, in the piston upward movement, through the discharging or outlet valve and duct, may be further arranged.

Preferably, said unidirectional valves comprise blade or reed elements 112 and 113, for example made of a carbon or "Kevlar" material, or any other suitable material, having a sufficient flexibility, heat and mechanical stress resistance, and which may also be made of any desired material and may operate in any mode of operation to overcome any vacuum passive resistances in said cylinder in a passive working mode of operation (for example needle, ball, cone valves or any other valve types to be further developed in the art).

Figure 16:
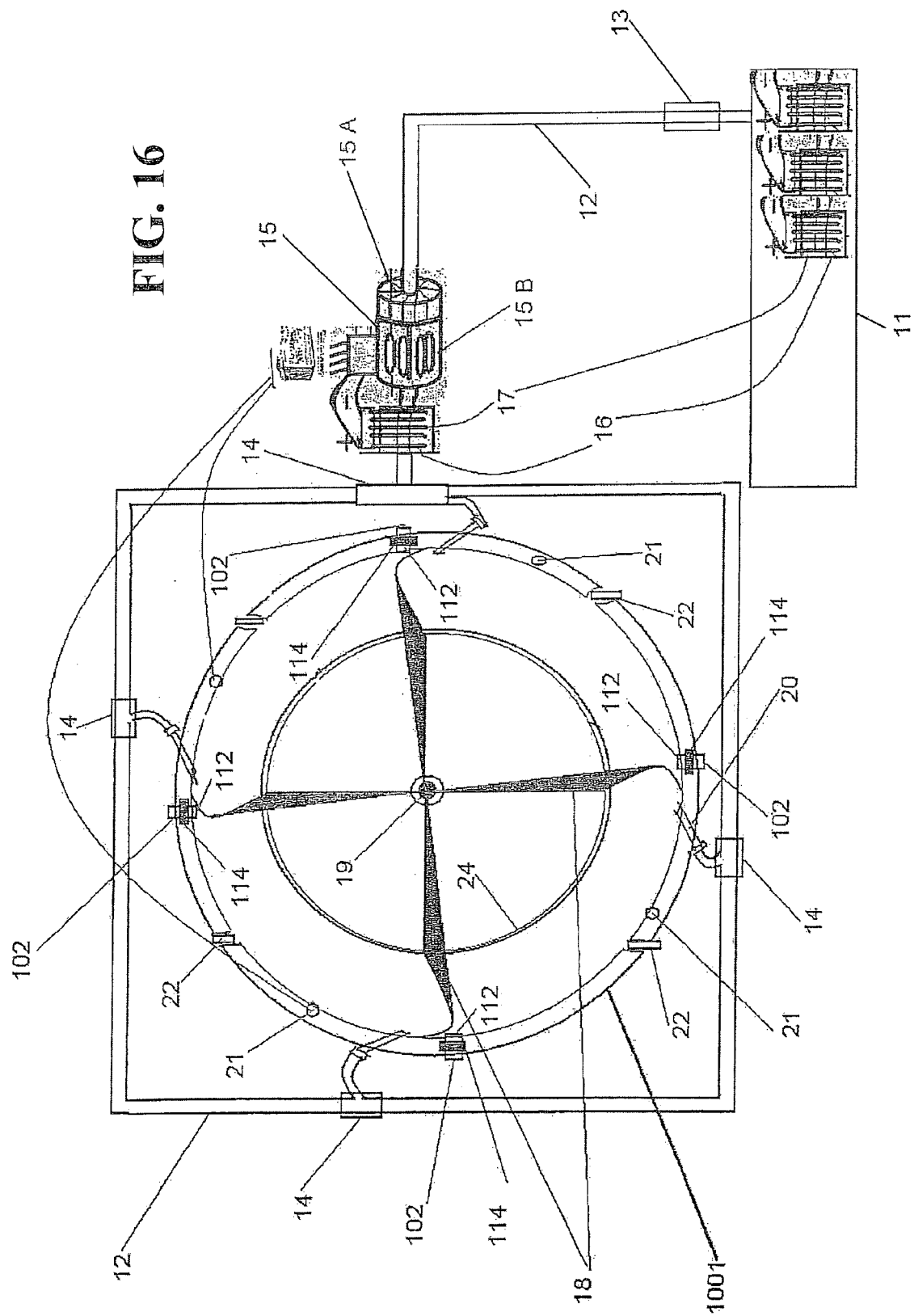
FIG. 16 shows a rotary engine being supplied with pressurized air.

A further non-exclusive embodiment of the invention is shown in FIG. 16.

The invention may also be embodied in a rotary motor 1001, including all the main elements and components of the reciprocating piston engine, with the advantage of an improved operation efficiency because of an absence of a reciprocating motion loss, in addition to a possibility of suitably timing the rotary arm 18 pressurized air inlet, through injectors 20, either simultaneously or in alternating sequences.

In this rotary engine, a circular band 24, made of a material adapted to resist against pressure and rotary arm 18 work, rigid therewith and pivoted on the pivot pin 19, may slide in a tightly sealed circular ring gear.

As the rotary arms 18 pass the photocell 21, the solenoid valve in the circuit 11 is so switched as to allow pressurized air stored in said tank 11 to supply the injectors 20 depending on the required power and as suitably timed to inject high pressure air at a concave portion of the rotary arm, which may be slidably driven together with the sealing band to accumulate, under the pressurized air force, a maximum energy at the received pressure.

Thus, the rotary arm, by accelerating its motion, and since the circular ring element inner environment is a tightly sealed one, will open, under a negative pressure, the ducts 102 to overcome the rotary arm passive work resistance.

Said duct unidirectional valves 112 feeding supplementary air to the circular ring element, thereby overcoming any resistances generated in a passive work mode of operation.

The filters 114 may suitable filter inlet air from the negative pressure ducts, said air being ejected, as the rotary arms are further pressure driven, through outlet valves 22 arranged, in the rotary direction, in front of the photocells for providing a further operating cycle by further injecting air.

The driving force generated by the engine will be applied to the central pivot pin 19, to in turn drive a driveshaft.

It has been found that the invention, in its two above disclosed not limitative embodiments, fully achieves the intended aim and objects.

In fact, the invention discloses a high-efficiency rotary piston engine, with non-polluting emissions, which, under given passive work use conditions (owing to the provision of suitably arranged filters) provides negative emissions, and in which, owing to the provision of suction ducts and unidirectional valves, it is possible, in addition to filtering outside air, and reintroducing the filtered air into the atmosphere, during the piston upward stroke, to further optimize the engine efficiency, while minimizing the pressurized air amount stored in the pressurized air tank necessary for operating the engine, while eliminating any resistance from the vacuum generated by the piston (or the rotary arm) during the passive work step of operation thereby the subject rotary engine provides, in addition to the other disclosed advantages, the further advantage of an absence of resistances on the driveshaft and cylinder due to the reciprocating motion.

Figure 9:
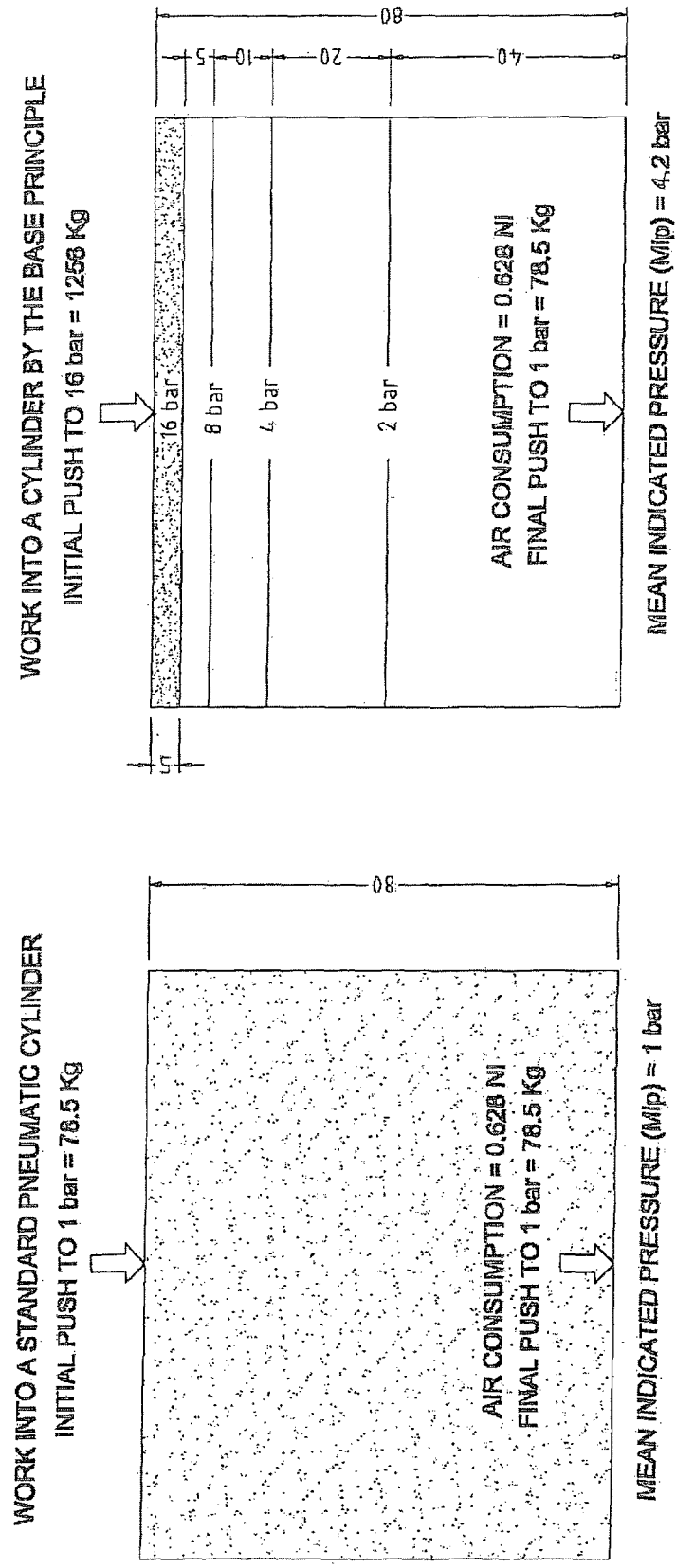
FIG. 9 shows an example of a use of the inventive engine, with reference to a dimensional measurement of the surface of a given engine piston (diameter 10 cm), a size of a related cylinder, the stroke in said cylinder (8 cm), the air amount to achieve a given average pressure for a normal pneumatic efficiency in the cylinder, and the same air amount, in an identical cylinder with an identical piston diameter, providing an average pressure which, in the shown calculation, is increased by 4.2 times.
Figure 10:
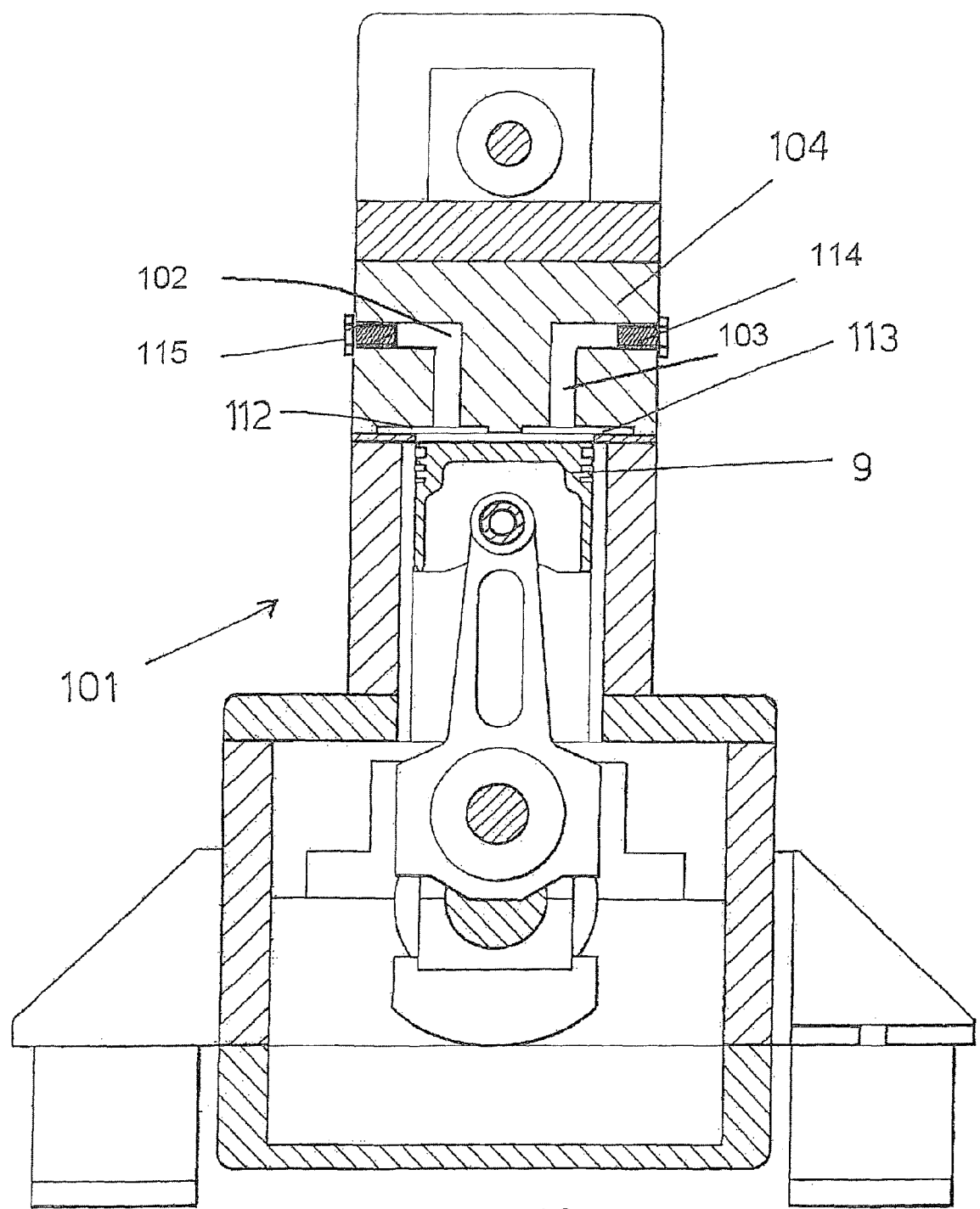
FIG. 10 is an enlarged partial front view, similar to FIG. 2, showing the engine suction ducts, unidirectional valves and outside air filters according to the present invention.
Figure 11:
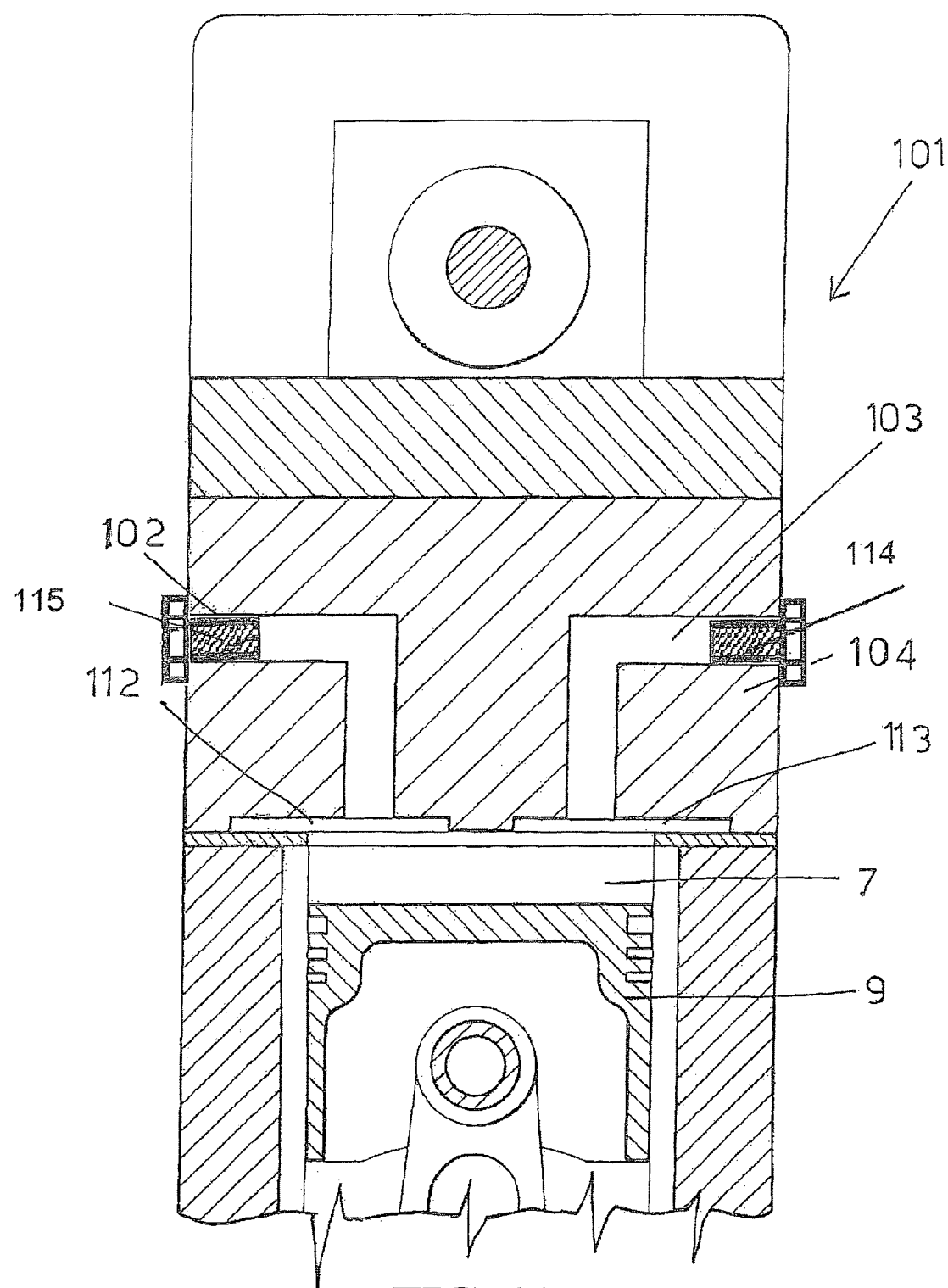
FIG. 11 is a further schematic view, on a scale larger than that of FIG. 10, showing the engine head including the engine ducts 102 and 103, unidirectional valves 112 and 113 and filters 114 and 115 therefor.
Figure 12:
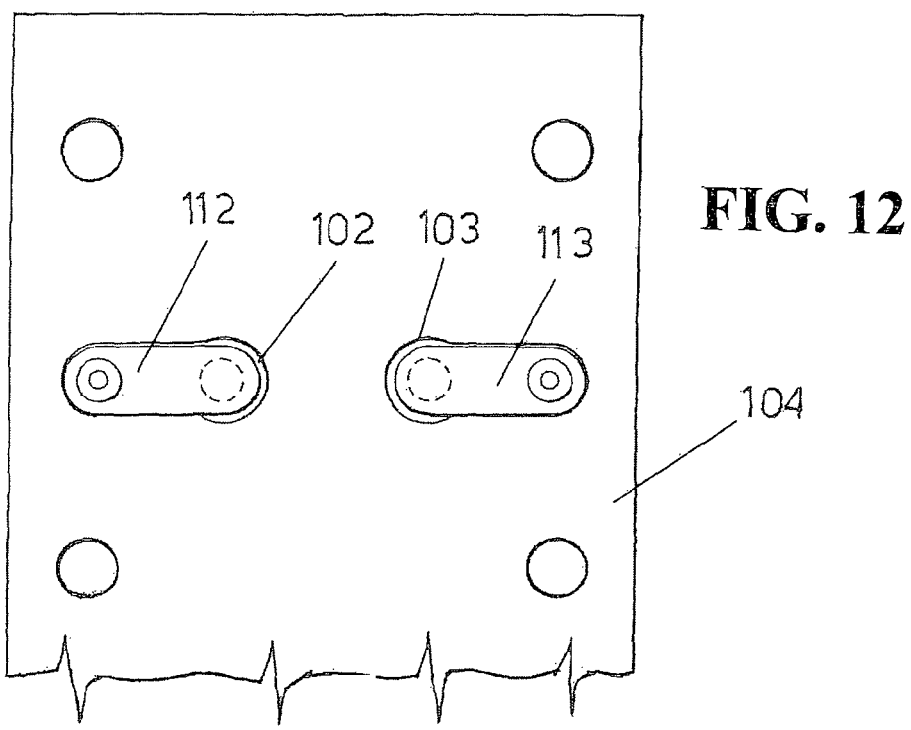
FIG. 12 is a top plan view of the engine head in which the unidirectional valves according to the present invention are arranged.
Figure 13:
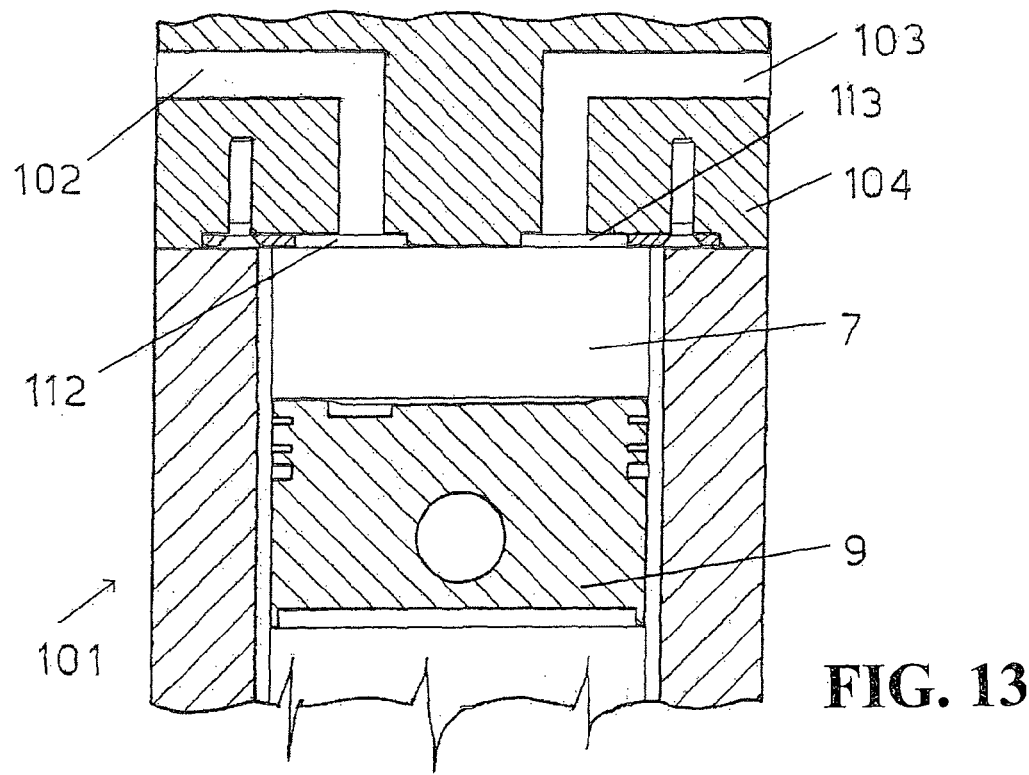
FIG. 13 is a cross-sectioned elevation view, on a further enlarged scale, of the engine head according to the invention.

The advantages provided by the inventive engine may be further stressed with reference to FIG. 9, by using, for a better understanding, hypothetic indicative values in the following practical example:

with a piston of a diameter of 10 cm and a stroke of 8 cm, a constant pressure of 1 bar is fed into the cylinder, thereby achieving a pressing force on the piston head, from the start to the end of its stroke, of 78.5 kg with the cylinder having an end pressure of 1 bar and with a pressurized air consume corresponding to 0.628 liters for each piston stroke.

If that same pressurized air amount (0.628 liters) would be fed to the first stroke of that same piston from the top dead center to the bottom dead center thereof, then, in that space, for example after a stroke of about 5 mm, it will be achieved a pressure corresponding to 16 bars, with a starting pressure on the head of the piston of about 1,256 kg, both the final pressing force and pressurized air consume for each stroke (0.628 liters) being held constant with respect to the first example.

Thus, in the first example, we will have an effective average pressure (Pme) with respect to the piston stroke, corresponding to 1 bar and, in the second example, a calculated effective average pressure (Pme) corresponding to about 4.2 bar.

Since the Pme is a very important parameter in a calculation of the engine power, the great advantage of the present invention would be self-evident.

The above example may be also applied to a rotary engine, while considering corresponding measurements for its surfaces also valid for the concave portion of the rotary arm tightly sliding in the circular crown.

Figure 17:
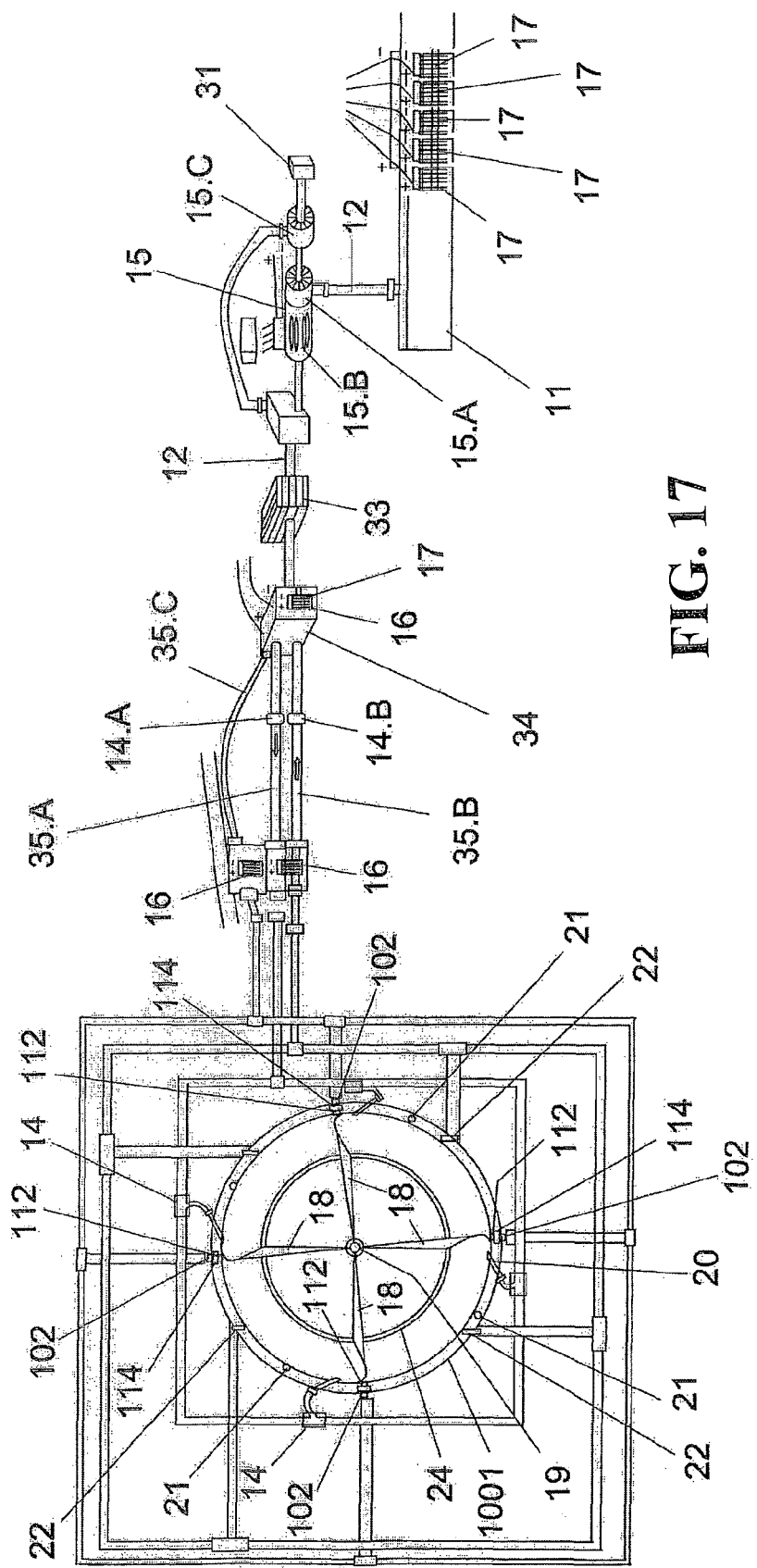
FIG. 17 shows a pressurized air rotary engine and pneumatic circuits connected thereto.
Figure 18:
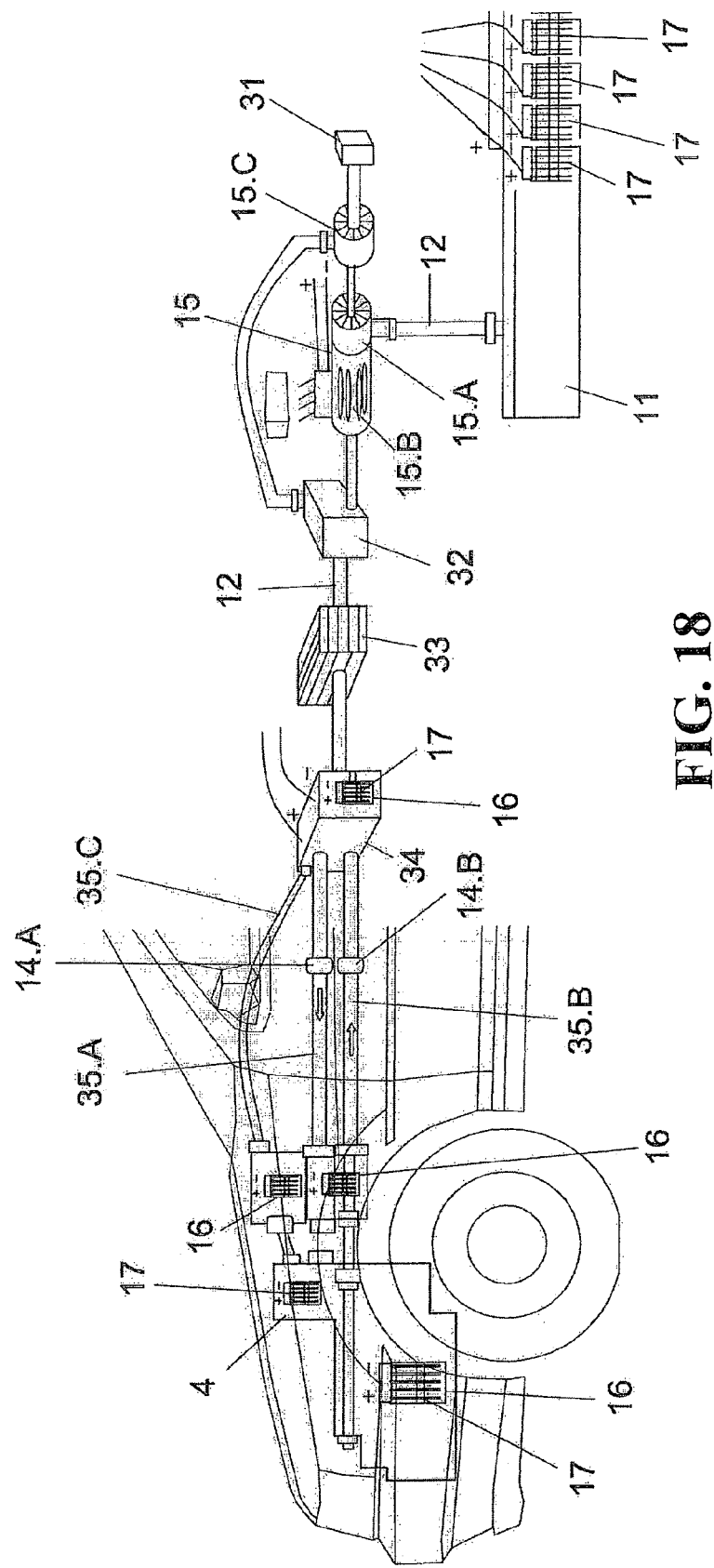
FIG. 18 shows the most preferred embodiment of the improved engine according to the present invention, mounted on a schematically indicated motor vehicle.

With reference to FIGS. 17 and 18 of the accompanying drawings, they show further preferred embodiments of the high-efficiency engine according to the invention, having a further improved efficiency and yield.

The above engine embodiment has been specifically designed to again exploit, on a side, the pressure difference existing between the primary tank 11 and engine 101 and, on the other hand, to exploit the movable vehicle system inertial mass to automatically switch the propelling device to a compressor mode of operation, while using it to brake the transmission and/or mechanical work bearing members, as it is clearly shown in FIG. 17.

Moreover, the above embodiment has been further specifically designed to optimize the system with respect to the air expansion temperature standpoint, on the turbo-alternator 15 downside, by applying one or more air/air exchangers so arranged in the system or vehicle as to allow air to be heated in front of the air inlet to the fluid heater 16.

With respect to the first novelty, the invention could provide one or more secondary turbines, 15.C, fixedly pivoted on the same axis as that of the primary turbine 15.A of the turbo-alternator 15 or, possibly, in parallel thereto, and the turbine blades of which may have a variable geometry depending on the status of the art.

Said secondary turbine 15.C, being driven by the air flow passing to the primary turbine 15.A, may pick up a further outside air amount in addition to that in the primary air tank 11, which air may be further advantageously filtered in the suction casing 31.

In this connection it should be apparent that this further air amount will be sucked into the system from the outside environment as far as an air flow from the primary tank to the engine is provided.

Said further air amount picked up by the secondary turbine 15.C is fed into a compensating and mixing chamber 32, thereinto also air from the turbo-alternator 15 is fed.

In addition to the advantage of using in the system an air amount in excess to that originally stored, thereby providing a greater energy amount to the engine for the overall flow duration, it should be moreover pointed out that air which is cooled downstream of the expansion in the primary turbine 15.A will have its temperature increased owing to the mixing in the compensating chamber 32, to which the air picked from the outside by the secondary turbine 15.C is fed.

It should be moreover pointed out that, even if the primary and secondary turbine operating pressures are different, the compensation chamber 32 will always allow to receive therein respective air flows since the end operating pressure of the engine 101, where the system mixed flow will be conveyed, will be always less than the pressure of both the components.

Said flows, having now an optimized temperature, will be drained, under a pressure differential, from the compensating and mixing chamber 32 to the air/air exchanger 33 where they will be further optimized because of the fluid temperature increase due to the traversing of the exchanger.

It is herein desired to further point out that a possible pressure loss may be easily overcome, since the pressure difference between the pressure of air originally contained in the primary preload tank 11 (by way of an example at 350 bars or more) and the operation pressure of the engine 101 (for example 30 bars or more) may also be larger than 300 bars.

Upon having traversed the air/air exchanger 33, the air flow, previously heated by mixing with the outside air picked by the secondary turbine 15.C, will be directed to an auxiliary tank 34 through the feeding or supply circuit 12 ducts, which auxiliary tank 34 may optionally comprise further heaters 16 including heating resistances 17, power supplied by the electric energy generated by the turbo-alternator 15, to allow air to be further heated.

As shown, to said auxiliary tank 34 three further ducts are connected: a feeding duct 35.A for feeding the engine with pressurized air heated in previous operating steps; a collecting duct 35.B for collecting pressurized air coming from the engine as it is in operation, and as, in a releasing step, operates ad a braking compressor; a reduction duct 35.C for reducing the passive resistance generated by sucking air from the outside environment through the negative pressure anti-vacuum valves during a passive work mode of operation of the piston: in fact, through such a duct 35.C pressurized air will be fed into the expansion chamber 7, through the anti-vacuum valves 112 and 113, from the auxiliary tank 34 where, as it will be disclosed hereinafter, will be collected also pressurized air generated by the operation of the propelling device in a braking compression mode of operation.

The ducts 35.A and 35.B may comprise respective electrovalves, that is: a first electro or solenoid valve 14.A to adjust or control the pressurized air flow from the secondary tank to the engine and a second electrovalve 14.B to adjust, in three or more adjustment stages, a progressive loading of air returning from the engine 101 as the latter operates in a braking compressor mode of operation, and as, in a releasing step, it is sent to the secondary tank 34.

In fact, the engine 101, during its release mode of operation, that is as it operates based on the inertial masses, when the pressurized air supply is shut-off as the accelerator device adjusting valve is closed, being adapted to automatically operate as a compressor: owing to the rotary movement of the piston 9 from the top died center to the bottom died center, by at first sucking air into its inside through the suction ducts 102 and 103 and anti-vacuum unidirectional valves 112 and 113 communicating the expanding chamber 7 of the engine 101 into the outside environment. Then, owing to the rotary movement of the piston 9 from the bottom die center to the top die center, the propelling device 101 will press air through the duct 35.B into the secondary tank 34, through the automatically actuated gate valves 36, or any other like controlling valves, arranged at the discharging or outlet valve 5 which, upon actuation for a connection with the releasing of the accelerator, will close the inlet to the output duct of air sucked from the outside environment and/or auxiliary tank into the expansion chamber through the anti-vacuum valves 112 and 113.

In such a mode of operation, the engine 101, being in a releasing step thereof, since such an operating step automatically actuate the compressor mode of operation, will generate a braking effect on the transmission assembly and hence on the mechanical work transmitting members, while allowing to store in the secondary tank 34 pressurized air to be immediately used as the engine accelerator is opened again, with a self-evident further increase of the system power efficiency.

All those same effects increasing the system efficiency may also be applied to a rotary embodiment 1001 of the inventive engine, as shown in FIG. 18, where:

The engine air inlet through the anti-vacuum valves of the ducts 35.C is provided by the ducts 37;

The optimized and heated air inlet to the engine through the injectors 20, coming from the auxiliary tank 34, is assured by the ducts 38;

The inlet of air to the auxiliary tank 34, through the unidirectional anti-vacuum valves 112 as the engine operates in a braking compressor mode of operation, through the outlet valves operating in a timed manner with the gate solenoid valve 36, is assured by the ducts 39.

The used materials, and the contingent size may be any depending on requirements.

Moreover, the supply and discharging system type, the suction negative-pressure duct, unidirectional valve and suction duct filters types, as well as their size, may be any, depending on requirements and the status of the art.

Moreover, the engine according to the present invention could be further improved, both with respect to its operating principle and with respect to each of its portions, according to the materials and status of the art.

The invention claimed is:

1. A high-efficiency reciprocating piston engine, driven by pressurized air or gas tank, said engine being adapted to operate by sucking a further supplementary air from an outside environment and discharging, at an end of an operating cycle, non-polluted air into said environment, said engine also including turbo-alternator means, heat exchanger means and one or more fluid heater means, wherein said engine comprises at least a cylinder and at least a piston movable in said cylinder, a cylinder head, a cylinder head pre-chamber forming a plenum chamber with said cylinder having a size proportional to a displacement of said engine and to a power to be achieved thereby, unidirectional valves, applied to one or more suction ducts formed in said cylinder head, thereby allowing said piston to draw, during a downward stroke thereof, said supplementary air from said outside environment to convey said supplementary air into an expansion chamber, wherein said valves are designed to overcome any resistance generated by a vacuum in said cylinder in a passive mode of operation of said engine, filter elements being arranged in said suction ducts, for filtering said supplementary air from said outside environment to said cylinder and engine, said supplementary air, after said engine operating cycle being reintroduced again, in a filtered non-polluted condition, into said outside environment in an upward stroke of said piston through an outlet valve and outlet ducts, said engine further comprising said turbo-alternator means, said heat exchanger means and said one or more fluid heater means for heating said air coming from said pressurized air tank to said cylinder and said cylinder head.

2. An engine, according to claim 1, wherein said engine comprises said one or more suction ducts formed in said cylinder head, to allow said supplementary air to be drawn from the outside environment into said cylinder, and said unidirectional valves, for preventing said supplementary air from flowing through a reverse path, during said piston downward stroke, a flow of said outside air being generated during a downstroke of said piston to a bottom dead center thereof under the effect of pressurized air in said pre-chamber and supplied by said pressurized air tank in an expanding stroke following a first air injection.

3. An engine, according to claim 2, wherein said unidirectional valves comprise one or more unidirectional valves made of a flexible heat and mechanical stress resistant material, said outside environment air being so conveyed to said cylinder head, thereby nullifying any passive resistances generated by a vacuum in said cylinder formed in a passive mode of operation.

4. An engine, according to claim 1, wherein said engine comprises an inlet valve communicating said engine head pre-chamber with said expanding chamber, and wherein said inlet valve, being held at a closed position thereof by a pressure in said pre-chamber, is automatically displaced as said piston is upward driven to its top dead center.

5. An engine, according to claim 4, wherein, as said inlet valve is upward driven, it communicates said pre-chamber with said piston head, and in an absence of a direct injection, said inlet valve starting to open upon ending a piston discharging phase, and before arriving at the top dead center, and being closed by displacing said piston from said top dead center.

6. An engine, according to claim 1, having at least two pistons and two cylinders wherein said cylinder head comprises synchronously operating outlet valves built-in to said cylinder head.

7. An engine, according to claim 1, wherein said pressurized air in said pressurized tank is continuously supplied.

8. An engine, according to claim 1, wherein said engine comprises one or more secondary turbines including variable geometry turbine blades.

9. An engine, according to claim 8, wherein said secondary turbine is supplied with an additional outside filtered air amount.

10. An engine, according to claim 9, wherein said additional air amount is supplied to a compensation and mixing chamber.

11. An engine, according to claim 1, wherein said engine further comprises an auxiliary tank including electric resistance heaters.

12. An engine, according to claim 11, wherein to said auxiliary tank are connected three further ducts comprising: a first duct for supplying to the engine pre-heated pressurized air; a second duct for collecting pressurized air in said auxiliary tank; and a third duct for reducing any passive resistances.

13. An engine, according to claim 12, wherein said first duct comprises an electrovalve to adjust a pressurized air flow from said tank.

14. An engine, according to claim 12, wherein said second duct comprises an electrovalve to adjust a progressive loading of said auxiliary tank by air returning from said unidirectional valves.

15. An engine, according to claim 11, wherein said engine comprises a gate electrovalve to close an access to an outside sucked air discharging duct and/or from the auxiliary tank to the expanding chamber.

16. An engine, according to claim 11, wherein said engine provides a braking effect on transmission and mechanical work transmitting members, while allowing to store in said auxiliary tank pressurized air.

17. An engine, according to claim 1, wherein said engine alternately operates, in a releasing mode of operation, with a pressurized air inlet valve in a closed position, and in a compressor mode of operation.

\* \* \* \* \*